No. 896,182. PATENTED AUG. 18, 1908.
R. H. VILLARD.
CONDUIT ROD.
APPLICATION FILED APR. 10, 1908.
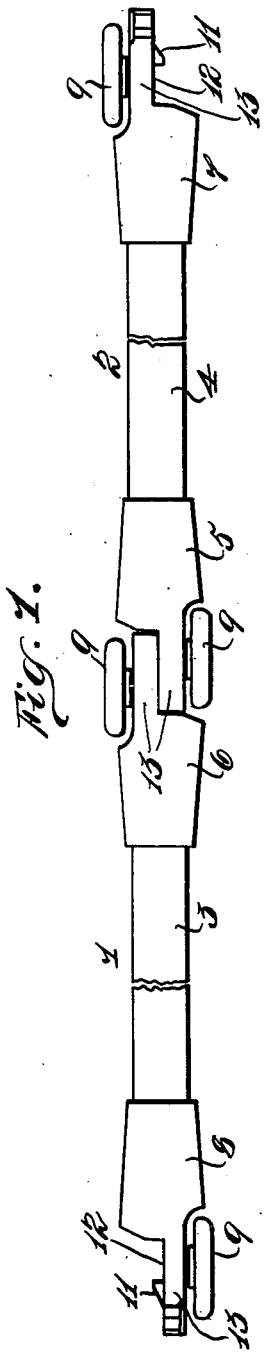
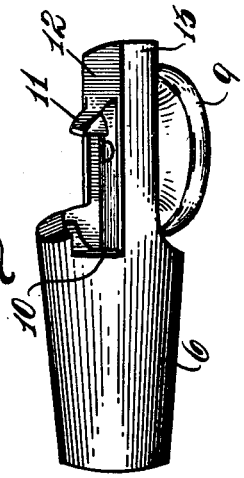
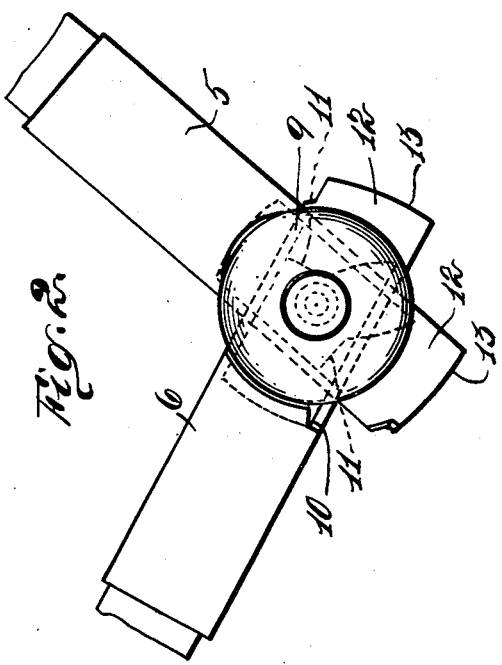
Witnesses:
C. A. Jarvis
Mabel Dittenhoefer
Inventor:
Richard H. Villard
By Chrystie and Wright
his Attorneys.

UNITED STATES PATENT OFFICE.

RICHARD H. VILLARD, OF NEW YORK, N. Y.

CONDUIT-ROD.

No. 896,182.   Specification of Letters Patent.   Patented Aug. 18, 1908.

Application filed April 10, 1908. Serial No. 426,396.

*To all whom it may concern:*

Be it known that I, RICHARD H. VILLARD, a citizen of the United States, residing at New York city, State of New York, have invented certain new and useful Improvements in Conduit-Rods, of which the following is a clear, full, and exact description.

The object of this invention is to so improve coupling rods for use in threading wires through conduits, that they may be readily connected one rod to another without selection of the end to be connected on the part of the operator. And a further object is to provide wheels for the coupling rods to make their travel through a conduit easy, to arrange said wheels symmetrically and at the same time occupy as little transverse space in the conduit, as possible.

To attain the first object mentioned, I make all coupling ends symmetrical on all rods. To attain the second object, I provide slabbed sides for the coupling members that the wheels may set within the recess formed, and take up little room.

The scope of my invention will be set forth in the claims.

In the accompanying drawings: Figure 1 is a plan view of a pair of coupling rods in coupled position. Fig. 2 is a side elevation of the ends of a pair of rods in the act of being coupled together, drawn to an enlarged scale. Fig. 3 is a perspective view of one of the couplings.

In carrying out this invention, the coupling rods 1 and 2 are generally composed of modern shafts 3 and 4, the ends of which are secured in the socket ends of couplings 7, 8, 5 and 6, see Fig. 1. Each coupling is preferably a casting and is provided as shown in Fig. 3 with a recess 10 and a projecting lug 11, together constituting a locking means when similar recesses and lugs on a second coupling are caused to engage therewith. Each individual coupling is provided with an extending projection 13, having a surface 12 formed on the center line of the coupling. Consequently when two couplings are placed in the position of Fig. 2 the projections 11 on opposite couplings will enter the recess below the surface 12, and the opposed surfaces 12 will come into close contact.

Upon swinging the parts from the position of Fig. 2 to the position of Fig. 1, the projecting ends 13 will pass into the recesses 10 and hold the coupling together so long as the angle is not great enough to allow the disengagement of the projection 13 from the recess 10. The projection 13 is made somewhat thinner than half the diameter of the socketed end 6 of the coupling, which produces a slabbed surface to each coupling member, forming a recess in the side of the coupling; within the recess the wheel 9 may be located. The wheel is freely pivoted to the slabbed surface of the projection. As a result of placing one wheel on each coupling, and forming the couplings slabbed as to their projections 13, I am enabled to get a pair of wheels at the joint when two couplings are connected, which will occupy the minimum amount of transverse space in a conduit during the use of my rod. By placing one wheel on each coupling, I am enabled to make each coupling absolutely symmetrical to the others, so that a man operating in a man hole need never reverse a rod but will always find the right end advanced for coupling with the rod already installed.

By making the narrow slabbed projections 13 in the shape described, I am enabled to produce locking means, that is, the recess 10 and projection 13 carrying the lug 11, which may be symmetrical on each coupling, also producing the advantage before described, i. e. making it immaterial which end of the rod is grasped by the operator, and also making it necessary to produce but one shape and form of casting for the manufacturer.

I claim as my invention:

1. Two conduit coupling rods, each rod having at both its ends a coupling socket, each socket being symmetrical to the others, locking means on each socket adapted for engagement with locking means on another socket, and a single wheel carried on each socket whereby a pair of wheels will be produced when adjoining sockets are secured together.

2. A coupling rod having a coupling socket at each end, each coupling socket being provided with locking means, and a single wheel carried at each end of said rod, one on each socket.

3. A coupling rod having a socket at each end comprising in part a projecting piece having a slabbed outer side, and a wheel journaled in said side, and occupying a recess formed by the slabbed side.

Signed at New York city, this 9th day of April 1908.

RICHARD H. VILLARD.

Witnesses:
F. WARREN WRIGHT,
MABEL DITTENHOEFER.